United States Patent [19]
Ferrero

[11] Patent Number: 5,470,129
[45] Date of Patent: Nov. 28, 1995

[54] ADJUSTABLE VEHICLE SEAT

[75] Inventor: Ferruccio Ferrero, Savonera-Venaria, Italy

[73] Assignee: Ferrero Giulio, S.p.A., Turin, Italy

[21] Appl. No.: 125,413

[22] Filed: Sep. 22, 1993

[30] Foreign Application Priority Data

Sep. 25, 1992 [IT] Italy ................... TO92A0785

[51] Int. Cl.⁶ ........................................ B60N 2/12
[52] U.S. Cl. .................. 297/330; 248/394; 248/396; 297/329; 297/344.17
[58] Field of Search ............................. 297/330, 329, 297/344.17; 248/394, 396, 419

[56] References Cited

U.S. PATENT DOCUMENTS

| | | | |
|---|---|---|---|
| 3,006,594 | 10/1961 | Gruendler | 248/396 X |
| 3,319,921 | 5/1967 | Nichols | 248/419 |
| 4,015,812 | 4/1977 | Heesch | 248/396 X |
| 4,605,192 | 8/1986 | Kluting et al. | 248/394 |
| 5,088,841 | 2/1992 | Ikegaya et al. | 297/362.11 |
| 5,292,178 | 3/1994 | Loose et al. | 297/362.11 |

FOREIGN PATENT DOCUMENTS

| | | |
|---|---|---|
| 0057617 | 1/1982 | European Pat. Off. . |
| 0098414 | 6/1983 | European Pat. Off. . |
| 0411850 | 7/1990 | European Pat. Off. . |
| 4002946 | 8/1991 | Germany . |

*Primary Examiner*—Peter R. Brown
*Attorney, Agent, or Firm*—Omri M. Behr; Matthew J. McDonald

[57] ABSTRACT

An adjustable vehicle seat wherein the frame supporting the seat portion is defined by two sides, each presenting a bottom portion sliding along a respective horizontal longitudinal guide, and a top portion integral with the seat portion and connected to the respective bottom portion so as to travel, in relation to the bottom portion, along a fixed vertical guide integral with the bottom portion and by virtue of two actuating devices located on either side of the fixed guide and each of which provides for rocking the respective top portion in relation to the respective bottom portion and about a respective axis perpendicular to the fixed guide.

16 Claims, 3 Drawing Sheets

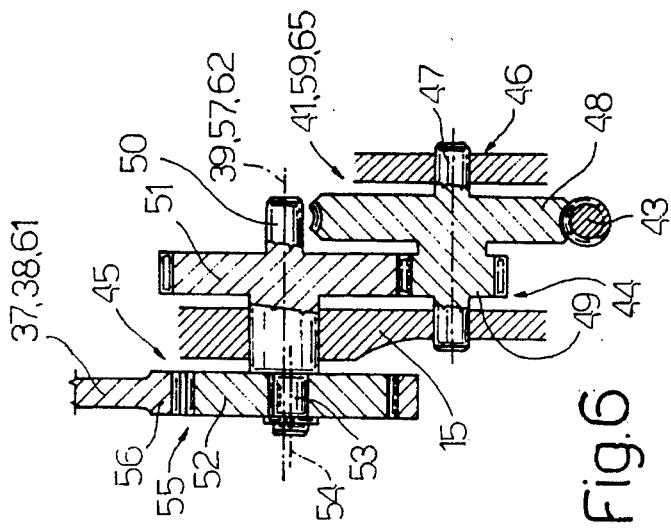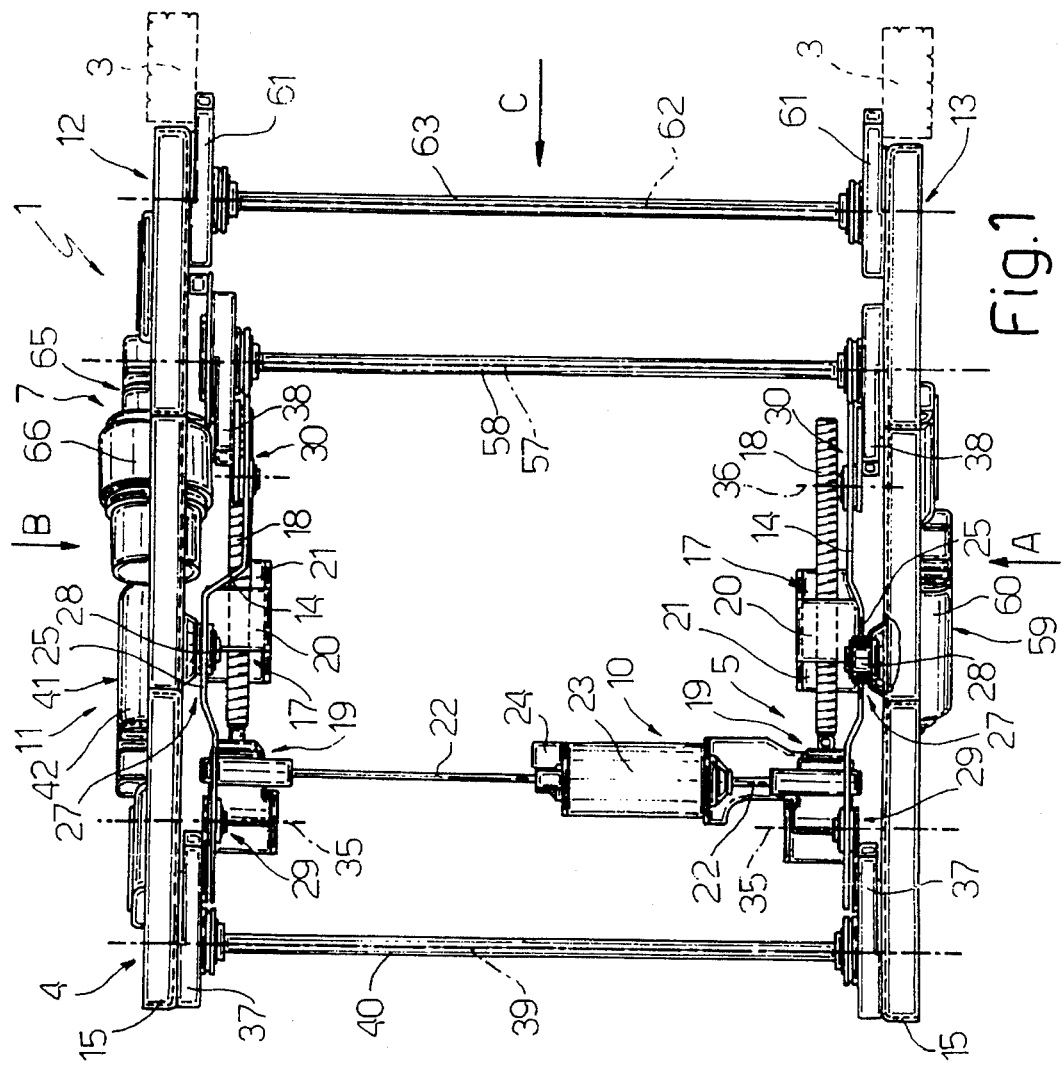

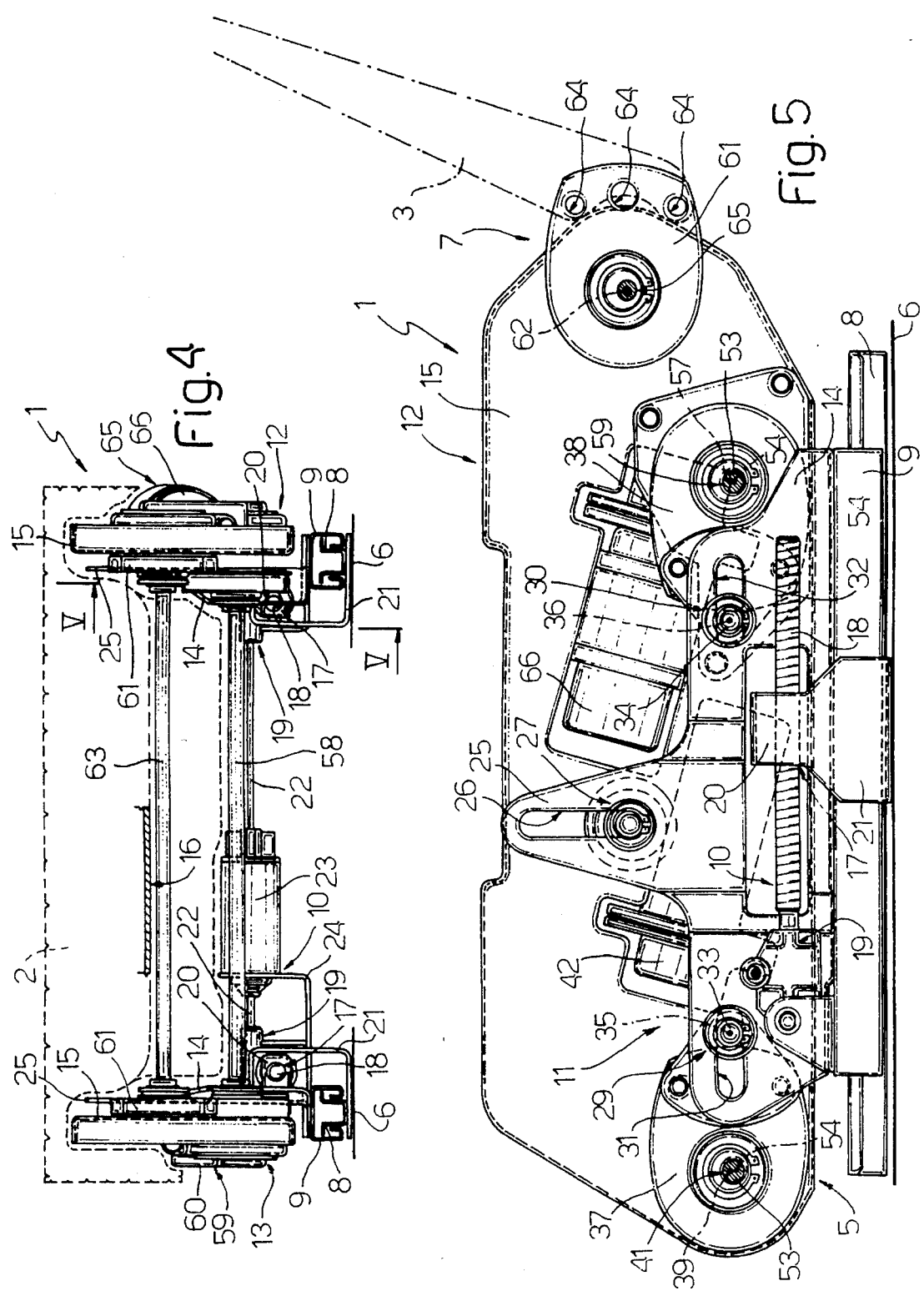

ADJUSTABLE VEHICLE SEAT

BACKGROUND OF THE INVENTION

The present invention relates to an adjustable vehicle seat.

In particular, the present invention relates to an adjustable vehicle seat of the type comprising a seat portion; a backrest connected for rotation to the seat portion; a seat portion supporting frame; first adjusting means for adjusting the position of the seat portion in relation to the vehicle; and second adjusting means for adjusting the angular position of the backrest in relation to the seat portion; the first adjusting means comprising first guide means fittable to the vehicle and for guiding the frame longitudinally, and shift means for vertically adjusting the position of the seat portion in relation to the first guide means.

On known adjustable seats of the aforementioned type, vertical adjustment of the seat portion is normally effected by means of an inclined skid device wherein a first slide, supporting the seat portion frame and defined at the bottom by an inclined edge, is connected in sliding manner to the inclined top edge of a second slide mounted in sliding manner to a longitudinal guide fitted to the vehicle floor.

Though relatively straightforward to produce, devices of the aforementioned type are less than satisfactory from the operating standpoint, by virtue of vertical adjustment of the seat portion also resulting automatically in an undesired change in its longitudinal position.

SUMMARY OF THE INVENTION

It is an object of the present invention to provide an adjustable seat of the aforementioned type designed, among other things, to overcome the aforementioned drawback.

According to the present invention, there is provided an adjustable vehicle seat comprising a seat portion; a backrest connected for rotation to the seat portion; a frame supporting the seat portion; first adjusting means for adjusting the position of the seat portion in relation to the vehicle; and second adjusting means for adjusting the angular position of the backrest in relation to the seat portion; the first adjusting means comprising first guide means fitted to the vehicle and for longitudinally guiding the frame, and shift means for vertically adjusting the position of the seat portion in relation to the first guide means; characterized by the fact that the frame comprises two sides, each comprising a bottom portion connected in sliding manner to said first guide means, and a top portion connected to the seat portion; said shift means comprising, for each said side, a vertical guide and slide assembly interposed between said two portions, and a first and second actuating device for imparting to the top portion rocking movements, directed in opposite directions and combinable between themselves, about respective axes perpendicular to said sides.

According to a preferred embodiment of the above seat, said two perpendicular axes are instantaneous rotation axes on either side of said vertical assembly.

The slide of each said vertical assembly is preferably connected to the respective guide so as to rotate, in relation to the guide, about an axis parallel to said perpendicular axes; each of the two actuating devices being located on the opposite side of the respective said perpendicular axis in relation to said vertical assembly.

Each actuating device also preferably comprises, for each said side, a horizontal guide and slide assembly interposed between said top and bottom portions; the slide of each horizontal assembly being connected to the respective said guide so as to rotate, in relation to the guide, about one said perpendicular axis.

BRIEF DESCRIPTION OF THE DRAWINGS

A non-limiting embodiment of the present invention will be described by way of example with reference to the accompanying drawings, in which:

FIG. 1 shows a plan view, with parts removed for clarity, of a preferred embodiment of the seat according to the present invention;

FIGS. 2, 3 and 4 show views as indicated respectively by arrows A, B and C in FIG. 1;

FIG. 5 shows a larger-scale section along line V—V in FIG.4;

FIG. 6 shows a larger-scale schematic view of a detail in the above drawings.

DETAILED DESCRIPTION OF THE INVENTION

Figure 2:
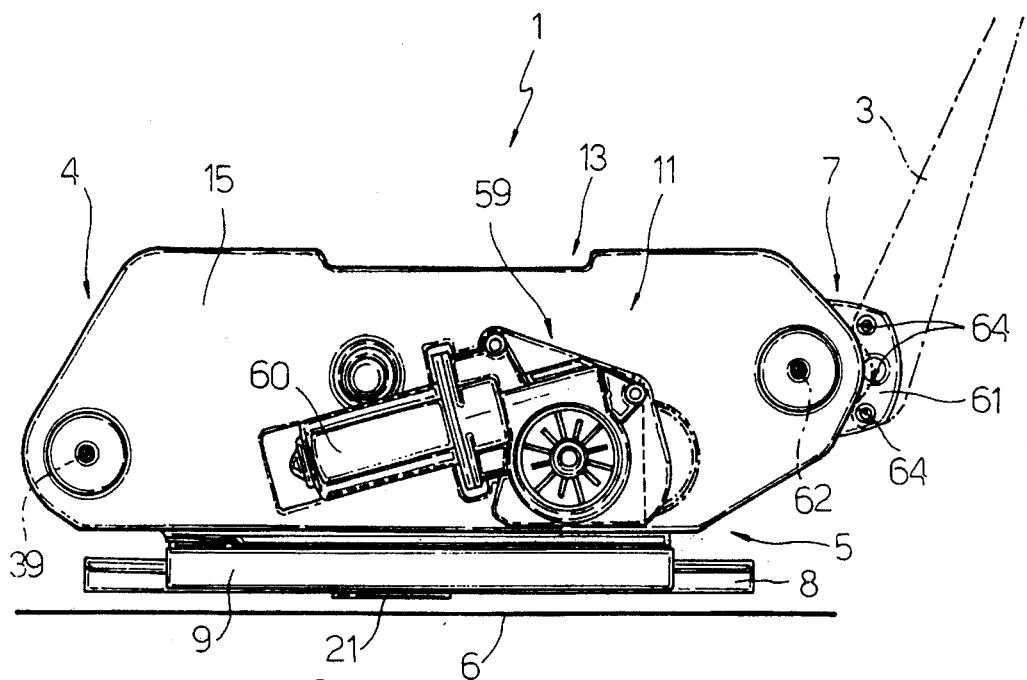

Number 1 in FIGS. 1 to 5 indicates an adjustable vehicle seat, particularly for motor vehicles, comprising a seat portion 2 (FIG. 4), and an inclinable backrest 3 connected for rotation to the rear portion of seat portion 2.

Seat 1 also comprises a frame 4 supporting seat portion 2; a first assembly 5 for adjusting the position of seat portion 2 in relation to floor 6 of the vehicle (not shown); and a second assembly 7 for adjusting the angular position of backrest 3 in relation to seat portion 2.

Assembly 5 comprises two parallel longitudinal guides 8 connected, in use, integral with floor 6; a slide 9 connected in sliding manner to each guide 8; an actuating assembly 10 for moving slides 9 synchronously back and forth and setting them in given respective positions along guides 8; and an actuating unit 11 for vertically adjusting the position of seat portion 2 in relation to guides 8 as described in detail later on.

As shown clearly in FIG. 1, frame 4 comprises two longitudinal sides 12 and 13, each extending upwards from a respective slide 9 and comprising (FIG. 5) a bottom portion or plate 14, of which respective slide 9 forms the bottom portion, and a top portion or plate 15, which, together with the other top plate 15, supports bottom 16 of seat portion 2, and, like the other top plate 15, is connected to respective bottom plate 14 via the interposition of actuating unit 11.

As shown clearly in FIGS. 1 and 5, for each slide 9, actuating assembly 10 comprises a screw and nut screw device 19 in turn comprising a rotating screw 18 parallel to respective slide 9 and integral with the output of a respective transmission member 19 in turn integral with bottom plate 14 of respective side 12, 13. Device 17 also comprises a nut screw 20 supported by a bracket 21 extending upwards from and integral with respective guide 8. The inputs of transmission members 17 are connected to respective coaxial rods 22 perpendicular to guides 8 and integral with the opposite ends of a through output shaft of an electric motor 23 supported between sides 12 and 13 by a bracket 24 integral with one of guides 8.

According to a variation not shown, slides 9 are moved freely along guides 8 by the user, and devices 17 are replaced by known manually operated lock elements located between guides 8 and respective slides 9, for selectively locking slides 9 in a number of axial positions in relation to guides 8.

As shown in FIGS. 1 and 5, plates 14 and 15 of each side 12, 13 are arranged in respective side by side vertical planes, with plate 15 outwards of plate 14, and are each substantially rectangular in shape with a substantially horizontal longitudinal axis. More specifically, plate 15 of each side 12, 13 is longer than plate 14, so that its opposite longitudinal ends project outwards of plate 14, and is higher than plate 14, so that its top edge projects beyond the top edge of plate 14. The top edge of each plate 14 presents a vertical, upward-projecting appendix 25 with a straight vertical slot 26, which acts as a guide for a respective vertical guide and slide assembly 27 forming part of actuating unit 11. The slide of each vertical assembly 27 is defined by a cylindrical pin 28 projecting from the inner surface of respective plate 15 towards plate 14 and perpendicular to guides 8, and extending in rotary and transversely sliding manner through respective slot 26.

Plates 14 and 15 of each side 12, 13 are also connected to each other by two horizontal guide and slide assemblies 29 and 30, which also form part of actuating unit 11, and are located at the opposite ends of plate 14 and symmetrically in relation to vertical assembly 27. The guides of assemblies 29 and 30 are defined by respective coaxial, horizontal slots 31 and 32 on either side of respective slot 26; while the slides of assemblies 29 and 30 are defined by respective pins 33 and 34 having respective axes 35 and 36 parallel to pin 28, and extending in rotary and transversely sliding manner through respective slots 31 and 32.

Pins 33 and 34 of each side 12, 13 form the instantaneous pivots of respective cranks 37 and 38 perpendicular to pins 33 and 34, and extending at least partly between respective plates 14 and 15.

There are two cranks 37, each at a different respective corresponding one of opposite sides 12 and 13, both being fitted parallel to each other and rotatably to respective plates 15 of respective sides 12, 13, so as to rotate, in relation to plates 15, about a common axis 39 perpendicular to guides 8 and coincident with the axis of a drive rod 40 extending between plates 15 and connecting cranks 37 integral with each other. The two cranks 37 and rod 40 together form the output member of an actuating device 41 in turn forming part of actuating unit 11. Actuating device 41 comprises a motor 42 supported on plate 15 of side 12, and having an output member (FIG. 6) consisting of a screw 43 for activating respective crank 37 via a reducer 44 and a planocentric drive 45.

As shown in FIG. 6, reducer 44 comprises a casing 46 integral with plate 15 of side 12; and a shaft 47 mounted for rotation on casing 46 and plate 15, and fitted with a helical input gear 48 meshing with screw 43, and an output pinion 49. Drive 45 comprises a shaft 50 coaxial with axis 39 and mounted for rotation through plate 15; and two gears 51 and 52, the first coaxial with axis 39 and meshing with pinion 49, and the second fitted to an appendix 53 extending axially from shaft 50 and having an axis 54 offset in relation to axis 39. Gear 52 constitutes the inner gear of a planocentric reducer 55, the outer gear of which is defined by an internally toothed ring gear 56 coaxial with axis 39 and formed through an end portion of crank 37 fitted to side 12.

Both cranks 38 are fitted parallel to each other and in rotary manner to respective plates 15 of respective sides 12, 13, so as to rotate, in relation to plates 15, about a common axis 57 perpendicular to guides 8 and coincident with the axis of a drive rod 58 extending between plates 15 and connecting cranks 38 integral with each other. The two cranks 38 and rod 58 together form the output member of an actuating device 59 identical to actuating device 41 and also forming part of actuating unit 11. Actuating device 59 is located on the opposite side to device 41 in relation to the common axis of pins 28, and comprises a motor 60 supported on plate 15 of side 13.

Figure 3:
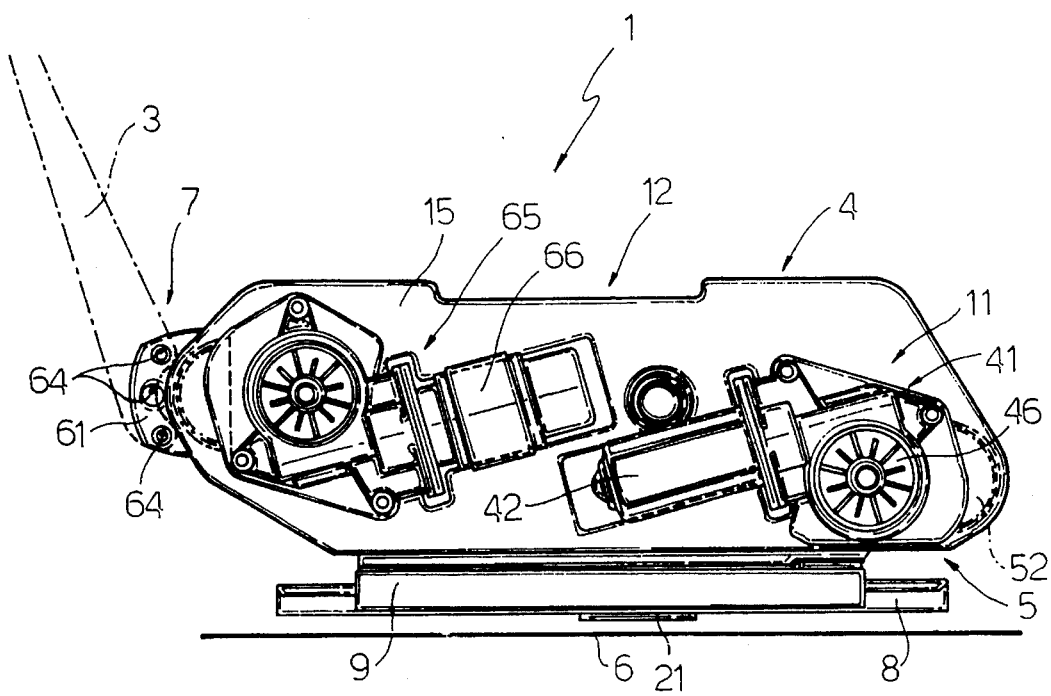

As shown in FIGS. 3 and 5, adjusting assembly 7 comprises two cranks 61 fitted parallel to each other and in rotary manner to the rear ends of plates 15 of respective sides 12, 13, so as to rotate, in relation to plates 15, about a common axis 62 perpendicular to guides 8 and coincident with the axis of a drive rod 63 extending between plates 15 and connecting cranks 61 integral with each other. On the free end opposite the end connected to rod 63 and projecting beyond the rear end of respective plate 15, each crank 61 presents a number of transverse holes 64 for respective pins (not shown) connecting crank 61 to the bottom end portion of a respective lateral surface of backrest 3.

The two cranks 61 and rod 63 together form the output member of an actuating device 65 identical to devices 41 and 59, and comprising a motor 66 supported on plate 15 of side 12.

According to a variation not shown, motors 42, 60 and 66 are replaced by hand knobs (not shown) for manually rotating respective cranks 37, 38 and 61.

In actual use, the longitudinal position of seat portion 2 in relation to floor 6 is adjusted by moving slides 9 one way or the other in relation to respective guides 8 by means of motor 23; while the vertical position of seat portion 2 is adjusted by simultaneously activating motors 42 and 60, which, via respective actuating devices 41 and 59, provide for rotating respective cranks 37 and 38 in opposite directions about respective axes 39 and 57 and so sliding respective pins 33 and 34 in opposite directions along respective slots 31 and 32.

In particular, motor 42 provides for moving both pins 33 along respective slots 31 and so rocking seat portion 2 about an instantaneous transverse axis coincident with axis 36 of pins 34 and located on the opposite side to actuating device 41 in relation to vertical assembly 27. By virtue of assembly 27, which forces the axis of pins 28 to move in a vertical direction defined by slots 26, horizontal displacement of pins 33 along slots 31 by motor 42 results, when motor 60 is idle, in displacement of axis 36 of pins 34 in the opposite direction, and in vertical displacement of axis 39.

Likewise, motor 60 provides for moving both pins 34 along respective slots 32 and so rocking seat portion 2 about an instantaneous transverse axis coincident with axis 35 of pins 33 and located on the opposite side to actuating device 59 and axis 36 in relation to vertical assembly 27. In this case also, by virtue of assembly 27, which forces the axis of pins 28 to move in a vertical direction defined by slots 26, horizontal displacement of pins 34 along slots 32 by motor 60 results, when motor 42 is idle, in displacement of axis 35 of pins 33 in the opposite direction, and in vertical displacement of axis 57.

The above two rocking movements, by virtue of each occurring about the rotation axis of the crank activating the other, are perfectly combinable, and, if performed simultaneously and by the same amount in opposite directions, combine so as to result in purely vertical displacement of seat portion 2.

Adjustment of backrest 3 in relation to seat portion 2, on the other hand, is effected by activating motor 66, which provides for adjusting the angular position of the backrest in relation to seat portion 2 via crank 61.

Unlike known vertical adjusting assemblies, actuating unit 11 thus provides, not only for vertically adjusting the position of seat portion 2 without affecting its longitudinal position, but also for enabling controlled rocking of seat portion 2 back and/or forth in relation to floor 6.

Moreover, actuating unit 11, by virtue of forming an integral part of frame 4—as opposed to being separate and, more specifically, interposed between the supporting frame of the seat portion and the vehicle floor, as on known seats—enables full setup of seat 1 prior to assembly on the vehicle (not shown).

As regards the structure of seat 1, it should be pointed out that, by virtue of being defined by two sides 12 and 13 and transverse rods 22, 40, 58 and 63, frame 4 may be adapted to seats of any width by simply employing transverse rods of different lengths. What is more, the transverse rods are relatively economical, by virtue of the planocentric drives for transmitting motion to cranks 37, 38 and 61 enabling the use of straightforward smooth transverse rods 40, 58, 63, unlike known seats which normally feature transverse rods consisting of high-cost screws.

The fact that both the seat portion and backrest motors are each fitted to a respective side 12, 13 also provides for solving various problems posed by known seats and relative to both the size of the seat and interference of the motors with the vehicle floor.

Finally, connection of backrest 3 directly to cranks 61 of actuating device 65 provides for rendering the structures of frame 4 and backrest 3 fully independent. In fact, whereas, on known seats, the backrest is hinged to the seat portion frame, and normally presents a portion extending downwards from the hinge axis to form a lever fitted on the end with the backrest adjusting devices, and the length of which conditions the location of the actuating devices in relation to the seat portion frame and, hence, to some extent also the shape and size of the frame, the same device 65 of seat 1 may be fitted to any type of backrest.

I claim:

1. An adjustable vehicle seat comprising a seat portion; a backrest connected for rotation to the seat portion; a frame supporting the seat portion; first adjusting means coupled to the frame for adjusting the position of the seat portion in relation to the vehicle; and second adjusting means coupled to the frame for adjusting the angular position of the backrest in relation to the seat portion; the first adjusting means comprising first guide means for attachment to the vehicle and for longitudinally guiding the frame and shift means coupled to the seat portion and first guide means for vertically adjusting the position of the seat portion in relation to the first guide means in a lift direction; characterized by the frame comprising two spaced sides, each side comprising a bottom portion connected in sliding engagement to the first guide means, and a top portion connected to the seat portion; said shift means comprising, for each said side, a vertical guide and slide assembly, the guide and slide assembly being coupled to and interposed between said bottom and top portions, and first and second actuating devices each coupled to the top and bottom portions and to a corresponding slide assembly on a side for imparting to the top portion rocking movements relative to the bottom portion for vertically lifting the top portion relative to the bottom portion in said lift direction, said rocking movements being directed about respective spaced first and second axes perpendicular to said sides, each said actuating devices including means coupled to said top and bottom portions for simultaneous rotation about a different axis and translating relative to the bottom portion transversely the lift direction in response to said rotation to effect said rocking movements.

2. A seat as claimed in claim 1, characterized by each vertical guide and slide assembly includes a first slide and a corresponding first guide, the slide of each said vertical slide assembly including means for rotatably securing that first slide to its respective first guide so as to rotate, in relation to its first guide, about a third axis parallel to said first and second axes (35, 36).

3. A seat as claimed in claim 2 wherein each actuating device comprises a horizontal guide and slide assembly interposed between and coupled to said top and bottom portions at each side; the horizontal guide and slide assembly including a second guide and a second slide, the second slide of each horizontal assembly being coupled to the respective second guide so as to rotate, in relation to the second guide, about one of said first and second axes.

4. A seat as claimed in claim 3 wherein on each said side, the second guide of each said horizontal assembly is coupled to one of said top and bottom portions, and the respective second slide is coupled to the other of said top and bottom portions; each actuating device comprising activating means for moving the respective second slides along the respective second guides and for rotating the second slides in relation to the second guides and about a respective one of said first and second axes.

5. A seat as claimed in claim 4 wherein the first guide of each said vertical guide and slide assembly is defined by a vertical slot formed in a respective corresponding bottom portion; and the respective first slide is defined by a first pin connected to said top portion and engaging said slot in rotation and in transversely sliding translation.

6. A seat as claimed in claim 5 wherein the second guide of each said horizontal assembly is defined by a horizontal slot formed in the respective corresponding bottom portion; and the respective second slide is defined by a second pin coaxial with a respective one of said first and second axes and engaging the respective horizontal slot in rotation and transversely sliding translation.

7. A seat as claimed in claim 6 wherein, on each said bottom portion, said horizontal slots are formed on a side of the respective vertical slot; and said means for respectively activating said second pins are supported on a respective top portion, and comprise a crank pivoting on a respective corresponding second pin and connected to the respective top portion so as to rotate about a respective fourth axis of rotation, and drive means coupled to the frame for rotating the crank about its axis of rotation and in relation to the respective top portion.

8. A seat as claimed in claim 7 wherein a transverse rod is interposed between each said crank on each said side, for connecting said two corresponding cranks angularly to each other; each pair of corresponding cranks and the respective rod defining an output member of a respective actuating device.

9. A seat as claimed in claim 8 wherein each said actuating device comprises said drive means for rotating said output member in relation to said top portions and about the fourth axis of the respective rod; said drive means comprising a planocentric drive.

10. A seat as claimed in claim 9 wherein said drive means also comprise a motor connected to said planocentric drive.

11. A seat as claimed in claim 1 wherein said second adjusting means is fitted to said top portion and supports said backrest.

12. A seat as claimed in claim 11 wherein said second adjusting means comprise a pair of parallel cranks, each connected to a respective top portion so as to rotate about a common axis parallel to said perpendicular first and second axes, and each having an end portion projecting beyond the respective top portion and connected integral with said backrest; and activating means coupled to the frame for rotating said cranks about said common axis of rotation.

13. A seat as claimed in claim 12 wherein said activating means comprises a planocentric drive.

14. A seat as claimed in claim 13 wherein said activating means comprises a motor connected to said planocentric drive.

15. An adjustable vehicle seat comprising:

a seat portion;

a backrest connected for rotation to the seat portion;

a frame for supporting the seat portion;

first adjusting means coupled to the frame for adjusting the position of the seat portion in relation to the vehicle, the first adjusting means comprising first guide means for attachment to the vehicle and for longitudinally guiding the frame and shift means coupled to the seat portion and first guide means for vertically adjusting the position of the seat portion in relation to the first guide means; and second adjusting means coupled to the frame for adjusting the angular position of the backrest in relation to the seat portion;

the frame comprising two spaced sides each comprising a bottom portion connected to the first guide means and a top portion connected to the seat portion;

said shift means comprising, for each said side, a vertical guide and slide assembly coupled to and interposed between said bottom and top portions for guiding the top portion relative to the bottom portion during lifting of the top portion relative to the bottom portion in a lift direction, and actuating means coupled to the top and bottom portions for vertically lifting the top portion relative to the bottom portion in the lift direction with rocking movements directed about respective spaced first and second axes perpendicular to said sides, said actuating means including first and second spaced means coupled to the top and bottom portions, each of said latter spaced means for independent rotation about a different one of said first and second axes and for simultaneously translating relative to the bottom portion transversely the lift direction in response to said rotation to effect said rocking movements, said vertical lifting occurring in response to said rocking movements.

16. An adjustable vehicle seat comprising:

a seat portion;

a backrest connected for rotation to the seat portion;

a frame supporting the seat portion;

first adjusting means coupled to the frame for adjusting the position of the seat portion in relation to the vehicle; and second adjusting means coupled to the frame for adjusting the angular position of the backrest in relation to the seat portion;

the first adjusting means comprising first guide means fitted for attachment to the vehicle and for longitudinally guiding the frame and shift means coupled to the seat portion and first guide means for vertically adjusting the position of the seat portion in relation to the first guide means in a lift direction;

the frame comprising two spaced sides, each side comprising a bottom portion connected in sliding engagement to the first guide means, and a top portion connected to the seat portion;

said shift means comprising, for each said side, a vertical guide and slide assembly, the vertical guide and slide assembly including a first guide and a first slide for each said side, the guide and slide assembly being coupled to and interposed between said bottom and top portions on each said side, and first and second actuating devices each coupled to the top and bottom portions and to a corresponding slide assembly on a side for imparting to the top portion rocking movements relative to the bottom portion for vertically lifting the top portion relative to the bottom portion in said lift direction, said rocking movements being directed about respective spaced first and second axes perpendicular to said sides;

each actuating device comprising a horizontal guide and slide assembly interposed between and coupled to said top and bottom portions at each side; the horizontal guide and slide assembly including a second guide and a second slide, the second slide of each horizontal assembly being coupled to the respective second guide so as to rotate, in relation to the second guide, about one of said perpendicular axes on each said side, the second guide of each said horizontal assembly being coupled to one of said top and bottom portions, and the respective second slide being coupled to the other of said top and bottom portions; each actuating device comprising activating means for moving the respective second slides along the respective second guides and for rotating the second slides in relation to the second guides about a respective one of said perpendicular axes;

the first guide of each said vertical guide and slide assembly being defined by a vertical slot formed in a respective corresponding bottom portion; and the respective first slide being defined by a first pin connected to said top portion and engaging said slot in rotation and in transversely sliding translation.

* * * * *